(12) United States Patent
Colrain et al.

(10) Patent No.: US 11,687,507 B2
(45) Date of Patent: Jun. 27, 2023

(54) TERMINATION OF DATABASE SESSIONS FOR PLANNED FAILOVER

(71) Applicant: Oracle International Corporation, Redwood Shores, CA (US)

(72) Inventors: Carol L. Colrain, Redwood Shores, CA (US); Pedro Arturo Cornejo Torres, Jal (MX); Kevin S. Neel, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 17/018,142

(22) Filed: Sep. 11, 2020

(65) Prior Publication Data

US 2021/0081382 A1    Mar. 18, 2021

Related U.S. Application Data

(60) Provisional application No. 62/899,160, filed on Sep. 12, 2019.

(51) Int. Cl.
   *G06F 15/16*    (2006.01)
   *G06F 16/21*    (2019.01)
   *G06F 16/23*    (2019.01)

(52) U.S. Cl.
   CPC ........ *G06F 16/217* (2019.01); *G06F 16/2365* (2019.01)

(58) Field of Classification Search
   None
   See application file for complete search history.

(56) References Cited

U.S. PATENT DOCUMENTS 5,680,610 A    10/1997  Smith et al.
6,041,357 A    3/2000   Kunzelman et al.
               (Continued)

FOREIGN PATENT DOCUMENTS

WO    WO 2008/051855    5/2008

OTHER PUBLICATIONS

U.S. Appl. No. 13/448,267, filed Apr. 16, 2012, Notice of Allowance, dated Aug. 14, 2014.

(Continued)

*Primary Examiner* — Alex Gofman
(74) *Attorney, Agent, or Firm* — Hickman Becker Bingham Ledesma LLP

(57) ABSTRACT

Techniques are described for performing session termination (s) for active sessions in response to a planned operation on a database server of a DBMS. In an embodiment, the DBMS receives a request for a planned operation on a database server. The database server may have session(s) established with a client system to receive request(s) to execute database command(s) on the DBMS. In response, the DBMS transmits to the client system a notification to drain a session with the database server, and the DBMS marks the sessions at the database to drain. The DBMS is configured to terminate any drain-marked sessions by the database server when a rule is satisfied, and the failover is expected to succeed, and/or that the session is unlikely to drain or to failover at a later point in the session lifecycle. The DBMS may identify, in a rule set, a rule having rule instructions to detect a possible termination point for the session before the drain timeout period expires. Based on the execution of the rule instructions before the drain timeout expires, the DBMS determines that a termination point for the session is detected where that session will failover. In such a way, sessions are (Continued)

failed over early and at points where the failover is expected to succeed.

20 Claims, 6 Drawing Sheets

(56) References Cited

U.S. PATENT DOCUMENTS

| | | | |
|---|---|---|---|
| 6,442,552 | B1 | 8/2002 | Frolund et al. |
| 6,622,119 | B1* | 9/2003 | Ramaswamy ........ G06F 40/274 |
| | | | 704/275 |
| 6,728,747 | B1 | 4/2004 | Jenkins |
| 6,868,445 | B1 | 3/2005 | Chebrolu |
| 7,415,470 | B2 | 8/2008 | Kasamsetty et al. |
| 7,502,824 | B2 | 3/2009 | Kaluskar et al. |
| 7,536,462 | B2 | 5/2009 | Pandya |
| 7,539,746 | B2 | 5/2009 | Bankier et al. |
| 7,552,218 | B2 | 6/2009 | Kaluskar |
| 7,631,107 | B2 | 12/2009 | Pandya |
| 7,634,512 | B2 | 12/2009 | Cao et al. |
| 7,747,754 | B2 | 6/2010 | Kalaukar et al. |
| 7,761,435 | B2 | 7/2010 | Stanev et al. |
| 7,849,173 | B1 | 12/2010 | Uhlik |
| 7,849,177 | B2 | 12/2010 | Uhlik |
| 7,853,698 | B2 | 12/2010 | Stanev |
| 7,890,457 | B2 | 2/2011 | Dias et al. |
| 7,890,458 | B2 | 2/2011 | Dias et al. |
| 8,005,966 | B2 | 8/2011 | Pandya |
| 8,024,299 | B2 | 9/2011 | Dias et al. |
| 10,374,924 | B1* | 8/2019 | Holland ............. H04L 43/0817 |
| 2003/0028654 | A1 | 2/2003 | Abjanic et al. |
| 2003/0131045 | A1 | 7/2003 | McGee et al. |
| 2003/0204769 | A1 | 10/2003 | Coughlin |
| 2004/0015600 | A1 | 1/2004 | Tiwary et al. |
| 2005/0021514 | A1 | 1/2005 | Barga et al. |
| 2005/0038848 | A1 | 2/2005 | Kaluskar et al. |
| 2005/0102261 | A1 | 5/2005 | Todd |
| 2005/0131879 | A1 | 6/2005 | Ghosh et al. |
| 2005/0186975 | A1 | 8/2005 | Yach et al. |
| 2006/0036617 | A1 | 2/2006 | Bastawala et al. |
| 2006/0282422 | A1 | 12/2006 | Al-Omari |
| 2007/0067266 | A1 | 3/2007 | Lomet |
| 2007/0147247 | A1* | 6/2007 | Kalonji ................ H04L 47/745 |
| | | | 370/235 |
| 2007/0180122 | A1* | 8/2007 | Barrett .................... H04L 67/24 |
| | | | 709/227 |
| 2007/0226218 | A1 | 9/2007 | Chatterjee et al. |
| 2008/0010240 | A1 | 1/2008 | Zait |
| 2008/0097960 | A1 | 4/2008 | Dias et al. |
| 2008/0097961 | A1 | 4/2008 | Dias et al. |
| 2008/0097995 | A1 | 4/2008 | Dias et al. |
| 2008/0097996 | A1 | 4/2008 | Dias et al. |
| 2008/0098003 | A1 | 4/2008 | Dias et al. |
| 2008/0098048 | A1 | 4/2008 | Cao et al. |
| 2008/0134219 | A1 | 6/2008 | Dorrance et al. |
| 2008/0228834 | A1 | 9/2008 | Burchall et al. |
| 2009/0077135 | A1 | 3/2009 | Yalamanchi et al. |
| 2010/0005097 | A1 | 1/2010 | Liang |
| 2010/0030818 | A1 | 2/2010 | Cooper et al. |
| 2010/0036957 | A1 | 2/2010 | Patel et al. |
| 2010/0042601 | A1 | 2/2010 | Kelley et al. |
| 2010/0293137 | A1 | 11/2010 | Zuckerman et al. |
| 2010/0318394 | A1 | 12/2010 | Nayak et al. |
| 2011/0212783 | A1 | 9/2011 | Dale et al. |
| 2011/0218981 | A1 | 9/2011 | Retnakumari et al. |
| 2011/0246419 | A1 | 10/2011 | Yancey |
| 2011/0276550 | A1 | 11/2011 | Colle et al. |
| 2012/0179645 | A1 | 7/2012 | Lomet et al. |
| 2013/0066837 | A1 | 3/2013 | Colrain |
| 2013/0066948 | A1 | 3/2013 | Colrain et al. |
| 2013/0066949 | A1* | 3/2013 | Colrain ................. G06F 9/466 |
| | | | 709/203 |
| 2013/0066952 | A1 | 3/2013 | Colrain et al. |
| 2013/0066955 | A1 | 3/2013 | Neel et al. |
| 2013/0297566 | A1 | 11/2013 | Colrain |
| 2014/0095547 | A1 | 4/2014 | Guo et al. |
| 2014/0229531 | A1 | 8/2014 | Neel et al. |
| 2015/0244775 | A1* | 8/2015 | Vibhor ................ G06F 11/0772 |
| | | | 709/203 |
| 2015/0326673 | A1 | 11/2015 | Neel et al. |
| 2016/0041882 | A1 | 2/2016 | Kruse |
| 2017/0264624 | A1* | 9/2017 | Wan .................... H04L 63/1425 |
| 2017/0289271 | A1 | 10/2017 | Seed |
| 2017/0322972 | A1 | 11/2017 | Lee et al. |
| 2018/0129688 | A1* | 5/2018 | Colrain ................. G06F 16/217 |
| 2018/0158014 | A1* | 6/2018 | Chandra ........... G06F 16/24564 |
| 2019/0102401 | A1 | 4/2019 | Neel |
| 2020/0233749 | A1* | 7/2020 | Podal .................. G06F 11/1443 |

OTHER PUBLICATIONS

Colrain, U.S. Appl. No. 15/803,644, filed Nov. 3, 2017, Office Action, dated Mar. 9, 2020.
Neel, U.S. Appl. No. 16/147,314, filed Sep. 28, 2018, Office Action, dated Jul. 28, 2020.
Papadomanolakis, U.S. Appl. No. 13/076,313, filed Mar. 30, 2011, Notice of Allowance, dated Oct. 19, 2012.
Papadomanolakis, U.S. Appl. No. 13/076,313, filed Mar. 30, 2011, Office Action, dated Jun. 5, 2012.
U.S. Appl. No. 13/229,641, filed Sep. 9, 2011, Notice of Allowance, dated May 6, 2013.
U.S. Appl. No. 13/229,641, filed Sep. 9, 2011, Office Action, dated Nov. 26, 2012.
U.S. Appl. No. 13/448,258, filed Apr. 16, 2012, Office Action, dated Nov. 27, 2013.
U.S. Appl. No. 13/448,258, filed Apr. 16, 2012, Office Action, dated May 27, 2014.
U.S. Appl. No. 13/448,258, filed Apr. 16, 2012, Notice of Allowance, dated Oct. 30, 2014.
Colrain, U.S. Appl. No. 13/542,278, filed Jul. 5, 2012, Office Action, dated Nov. 23, 2012.
U.S. Appl. No. 13/448,267, filed Apr. 16, 2012, Office Action, dated Jan. 24, 2014.
U.S. Appl. No. 13/542,278, filed Jul. 5, 2012, Examiner's Answer, dated Jan. 29, 2014.
U.S. Appl. No. 13/542,278, filed Jul. 5, 2012, Notice of Allowance, dated Jun. 15, 2016.
U.S. Appl. No. 13/542,278, filed Jul. 5, 2012, Notice of Allowance, dated Nov. 4, 2016.
U.S. Appl. No. 13/542,278, filed Jul. 5, 2012, Office Action, dated Nov. 23, 2012.
U.S. Appl. No. 13/563,680, filed Jul. 31, 2012, Notice of Allowance, dated Dec. 23, 2013.
U.S. Appl. No. 14/231,347, filed Mar. 31, 2014, Notice of Allowance, dated Mar. 17, 2015.
U.S. Appl. No. 14/231,347, filed Mar. 31, 2014, Office Action, dated Nov. 19, 2014.
U.S. Appl. No. 14/748,451, filed Jun. 24, 2015, Notice of Allowance, dated Nov. 1, 2016.
U.S. Appl. No. 14/748,451, filed Jun. 24, 2015, Office Action, dated May 16, 2016.
U.S. Appl. No. 13/542,278, filed Jul. 5, 2012, Final Office Action, dated May 2, 2013.
U.S. Appl. No. 13/448,267, filed Apr. 16, 2013, Office Action, dated Jul. 23, 2013.
Liu et al., "ad-heap: an Efficient Heap Data Structure for Asymmetric Multicore Processors", In Proceedings of Workshop on General Purpose Processing Using GPUs, ACM, dated 2014, 10 pages.
LaMarca et al., "The Influence of Caches on the Performance of Heaps", dated Jan. 6, 1997, 26 pages.
Galanis et al., "Oracle Database Replay," ACM, 2008, pp. 1159-1170 (12 pages).
Furtak et al., "Using SIMD Registers and Instructions to Enable Instruction-Level Parallelism in Sorting Algorithms", Acm Symposium on Parallel Algorithms and Architectures, dated 2007, 10 pages.

(56) References Cited

OTHER PUBLICATIONS

D.E. Knuth, "The Art of Computer Programming", vol. 3: 2nd Edition Sorting and Searching, ISBN: 0-201-03803-X, pp. 129-157 from book, dated 1973.
Colle et al., "Oracle Database Replay", ACM, dated 2009, 4 pages.
"Database Replay", Oracle White Paper, dated 2007, 19 pages.
"28 Transparent Application Failover", Oracle® Database JDBC Developer's Guide and Reference 10g Release 2 (10.2) Part No. B14355-04 from the Internet on Jul. 25, 2011, dated 1999 (3 pages).
Neel, U.S. Appl. No. 16/147,314, filed Sep. 28, 2018, Interview Summary, dated Mar. 19, 2021.
Neel, U.S. Appl. No. 16/147,314, filed Sep. 28, 2018, Advisory Action, dated Mar. 24, 2021.
Neel, U.S. Appl. No. 16/147,314, filed Sep. 28, 2018, Final Office Action, dated Jan. 13, 2021.
Neel, U.S. Appl. No. 16/147,314, filed Sep. 28, 2018, Office Action, dated Nov. 18, 2021.
Neel, U.S. Appl. No. 16/147,314, filed Sep. 28, 2018, Final Rejection, dated Jul. 14, 2022.

\* cited by examiner

TERMINATION OF DATABASE SESSIONS FOR PLANNED FAILOVER

CLAIM BENEFIT AND RELATED APPLICATIONS

This application claims the benefit under 35 U.S.C. § 119(e) of provisional application 62/899,160, filed on Sep. 12, 2019, the entire content of which is hereby incorporated by reference for all purposes as if fully set forth herein.

This application is related to U.S. application Ser. No. 16/147,314 "Session State Tracking," filed on Sep. 28, 2018, the entire contents of which is hereby entirely incorporated by reference as if fully set forth herein; and U.S. application Ser. No. 15/803,644, entitled "Safe Release of Database Sessions for Planned Maintenance Operations," filed on Nov. 3, 2017, the entire contents of which is hereby entirely incorporated by reference as if fully set forth herein.

This application is also related to (1) U.S. Pat. No. 9,600,371, entitled "Preserving Server-Client Session Context," filed Jul. 5, 2012, the entire contents of which is hereby entirely incorporated by reference as if fully set forth herein; (2) U.S. Pat. No. 8,924,346, entitled "Idempotence For Database Transactions," filed Apr. 16, 2012, the entire contents of which is hereby entirely incorporated by reference as if fully set forth herein; (3) U.S. Pat. No. 8,984,170, entitled "Idempotence For Database Transactions," filed Apr. 16, 2012, the entire contents of which is hereby entirely incorporated by reference as if fully set forth herein; (4) U.S. Pat. No. 8,549,154, entitled "Recovering Stateful Read-Only Database Sessions," filed Sep. 9, 2011, the entire contents of which is hereby entirely incorporated by reference as if fully set forth herein; (5) U.S. Pat. No. 8,725,882, entitled "Masking Database Outages From Clients And Applications," filed Jul. 31, 2012, the entire contents of which is hereby entirely incorporated by reference as if fully set forth herein; (6) U.S. Pat. No. 9,124,670, entitled "Transactional And Non-Transactional Data For Maintaining Session State," filed Mar. 31, 2014, the entire contents of which is hereby entirely incorporated by reference as if fully set forth herein; (7) U.S. Pat. No. 9,591,103, entitled "Transactional And Non-Transactional Data For Maintaining Session State," filed Jun. 24, 2015, the entire contents of which is hereby entirely incorporated by reference as if fully set forth herein; (9) U.S. Pat. No. 7,502,824, entitled "Database Shutdown With Session Migration," filed May 1, 2006, the entire contents of which is hereby entirely incorporated by reference as if fully set forth herein; (10) U.S. Pat. No. 7,552,218, entitled "Transparent Session Migration Across Servers," filed Aug. 12, 2004, the entire contents of which is hereby entirely incorporated by reference as if fully set forth herein; and (13) U.S. Pat. No. 8,380,665, entitled "Application Workload Capture And Replay System," filed Mar. 30, 2011, the entire contents of which is hereby entirely incorporated by reference as if fully set forth herein.

FIELD OF THE TECHNOLOGY

The present invention relates to the field of electronic database management, in particular to the termination of database sessions for planned failover.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In order to gracefully shutdown a database server (or a critical service thereof) for planned maintenance, the database management system (DBMS) has to ensure that the applications using the database server are disconnected in an orderly manner. The applications connect with the DBMS to issue request(s) to perform database user calls, which execute SQL statements, API calls and other commands in a session. One approach may be to wait until the execution of the request(s) issued within the session is completed and then, disconnect the connection. However, in many cases, requests do not complete in the allocated time. Requests may execute partially and then stop progressing; or requests may have long-running user calls, which may not complete within the maintenance window; or for some requests, the instruction(s) that the request has completed are not received by the client drivers from the client application.

The problem is further exacerbated when requests are grouped in one session. To avoid the overhead of opening a separate new connection for each request, applications use connection pools (CP). The CP alleviates the frequent resource-intensive connection/session establishment incurred by an application and/or a DBMS. Rather than closing an application's connection at the end of a request, the application "returns" the connection to the CP for a later re-use.

Such "caching" of connections is more efficient by avoiding the overhead of creating a new connection with the DBMS and avoiding the overload of the DBMS with connections during demand spikes. To send the DBMS another request, the application requests a connection from the CP Manager (CPM), which provides the application with an available idle but open connection. Thus, the application obtains a connection from the CP without the overhead of establishing a new connection unless none are available. The DBMS is not overloaded because CP's configuration allows for only a limited set of connections to the DBMS to service. Only if there is no available connection, the CP may be configured for more connections, and a new connection can be created.

Although such caching of open connections optimizes resources expended for providing connections, the caching significantly complicates planned maintenance(s) for the DBMS. To perform the planned maintenance, the connections to the DBMS need to be terminated. Because each and every open connection is an indication that an active session may be present, the DBMS cannot simply disconnect all the connections without disrupting application(s)' work. Instead, the DBMS has to notify the CPM to "drain" (i.e., close) connections that are returned to the CP when the session(s) are closed by the application.

For a "compliant" CPM (which is configured to orchestrate session draining specifically with and under the control and management of the DBMS), the DBMS sends a notification (e.g., Fast Application Notification (FAN)) to the CPM when maintenance is initiated. The CPM gradually releases idle connections that have not been borrowed. The CPM releases in-use connections when the application releases the connections to the CP. The CPM may gradually release the returned connection to avoid a logon storm as the connections in the CP reconnect to the new, failover, instance. In this way, application work that does return the connection to the pool is not disrupted in a disorderly manner.

For a DBMS with multiple active instances, the service may already be available elsewhere, and a compliant CPM has such information. For a different type of DBMS (e.g., active-passive), the compliant CPM is notified that the services have resumed, the CPM rebalances the connections across available instances of database servers as directed by the load balancing information provided by the DBMS or internally by the CPM. This solution works very well for application(s) that return connections between requests to compliant CPM's within the allotted draining time.

Many applications, however, do not use a compliant CPM. Even if a compliant CPM is available to be used by an application, the application may have its own certified stack that includes non-compliant CPM's (or no CPM at all). Such an application is unwilling to re-certify, and administrators are unwilling to reconfigure properties for thousands of such applications and containers to make such an application compliant with notifications from the DBMS. The re-certification may require new application development, which is a very costly process, and in some cases, may be even impossible for a client without access to the existing application stack's source code.

Furthermore, integration of third-party application servers with a compliant CPM may cause loss of transaction management and metric collection. Even with a certified compliant CPM, connections may not be returned within the drain timeout, and/or notifications may not be received due to a misconfiguration of the port, or an incompatible driver, as non-limiting examples.

Some application providers use manual processes to perform planned maintenance. For example, according to one procedure, database administrators (DBA's) and application support team schedule planned maintenance at the lightest usage time (e.g., in the middle of the night or on a special holiday such as Thanksgiving, New Year's Eve, or Chinese New Year). The DBA team communicates with the application support team to stop the application servers using the database server instances for the DBA team to perform the maintenance. There is an assumption that the work is strictly partitioned, limiting the ability of the system to scale and perform maintenance during the normal operation. When the application tier is stopped, the DBA's are notified to progress with the DBMS maintenance. When the maintenance is complete, the DBA's notify the application team to restart the stopped application servers and to stop the next set of application servers until all the database server instances of the DBMS are updated.

This procedure is cumbersome and inflexible in system management, lowers availability and increases the likelihood of mistakes, and prohibits proper load balancing and scale-out at runtime. The procedure does not scale to large cloud maintenance operations for numerous applications, and where it is impossible to agree on maintenance windows and allow for downtimes. As a result, users often see downtime during planned maintenance events:

Service is unavailable,
Application owners are unable to agree on maintenance windows,
Long-running batch jobs (batches) see errors or are stopped in advance,
Errors due to application work exceeding the allowed drain time,
DBA's and engineers work off-hours, and
Application and middleware components are restarted.

Because the "manual" communication process does not scale well, sometimes, maintenance is applied using a methodology that excludes relying on the client application logic. The DBMS halts the database stacks in a rolling fashion causing unpredictable errors for the applications. For a cloud-based DBMS, which has to be highly-available, this is completely unacceptable. Arbitrary and disorderly termination of an in-use session by a DBMS due to planned maintenance or for other purposes such as rebalancing, results in ambiguous errors returned to user applications, leading to user frustration, canceled and duplicated work, and in the worst cases, a restart of applications and application-related servers as valid transactions fail.

Most cloud-based paradigms have a contractual obligation to apply database patch sets within a set time duration (e.g., at least once a quarter) and CPU-related patches (security patches) almost immediately. A DBMS that uses the "database as a service" is an example of this. The planned maintenance may create a disruptive experience for the applications if no techniques are used to alleviate this problem. For example, the survey of planned maintenances indicates:

a great percentage of the applications fail during the patching,
inability to negotiate maintenance windows across organizations,
database sessions are aborted,
unlike other cloud solutions, availability of a cloud-based DBMS due to planned maintenance may be worse or in par with a standalone DBMS,
long recovery of systems that depend on the DBMS under planned maintenance. Systems operate in unison. When one system is taken out of production, it takes a long time for the whole system to recover.

Thus, there is a need for the application requested work to migrate from the database server instance under maintenance to another functioning server instance without the application incurring errors. Gradual migration of work is desirable. Additionally, the solution cannot make any changes to applications or mid-tier configurations because such changes are not under the control of the DBMS cloud provider.

To terminate database sessions in a manner that does not disturb the application, the DBMS needs visibility into connection management within the application or the CPM to determine that all the connections with the database server can be safely disconnected. For an application (through the CPM or itself) that caches a connection, the sheer presence of a connection does not indicate to the DBMS that the connection or one or more sessions over the connection are actively used. A session may be actively used while no user calls are being sent, or the session(s) of a connection may have been already used for user calls by the application, but the application has not returned the connection to the CP.

Thus, a connection may continue to exist because the application fails to release the connection to the pool, or the application may not be using a connection pool but instead has dedicated connection(s) with the DBMS that are always open. Additionally, even if all active sessions are closed and connections released to the CP, the CPM may hold onto the connections. Unless notified, the DBMS would not know about the connections that have been released by the application and are safe to disconnect. Such lack of integration may be due to a CPM being non-compliant, and, as such, missing one or more components necessary to communicate with the DBMS regarding the connections.

Even with the proper draining of the session, the application may fail due to many causes, including the allocated maintenance window, draining timeout period, being too short, the application having no idle points to drain, the configuration, and client-driver and database versions not supporting draining, and failover being disabled.

Some applications support unplanned outage failover and thus may often continue to operate without error in many draining scenarios. But even such applications may reach points in their requests at which failover is not possible, and so may still receive errors if the DBMS disconnects them at those specific points. Such non-draining sessions may be caused by third-party applications that have no draining points identified, such as connection tests, request boundaries, or other patterns; have long-running reports or batch query operations; and/or idle sessions that make no progress.

More examples of non-draining sessions may include sessions with a CPM or client-driver that are not capable of receiving or processing the notification. The notification may fail if FAN or other messaging mechanisms are not configured on the application side, or if FAN or other messages are not received for sessions because of lack of messaging infrastructure, unsupported drivers, ports are closed for communication, certificates for secure communications.

Accordingly, in such examples, the DBMS cannot safely terminate sessions and disconnect the connections to perform disconnection-requiring planned maintenance. New techniques for the DBMS to determine at which point to terminate a database session, whether pooled or not pooled, are needed for minimizing application errors for disconnection-requiring planned operations.

Planned maintenance is an example of possible operations that require the database sessions to be terminated without disrupting applications. Other non-limiting examples of operations include re-balancing database sessions or workloads among database servers of a DBMS. The term "disconnection-requiring planned operation" or simply "planned operation" refers to such an operation.

BRIEF DESCRIPTION OF THE DRAWINGS

In the drawings of certain embodiments in which like reference numerals refer to corresponding parts throughout the figures.

DETAILED DESCRIPTION

Figure 1:
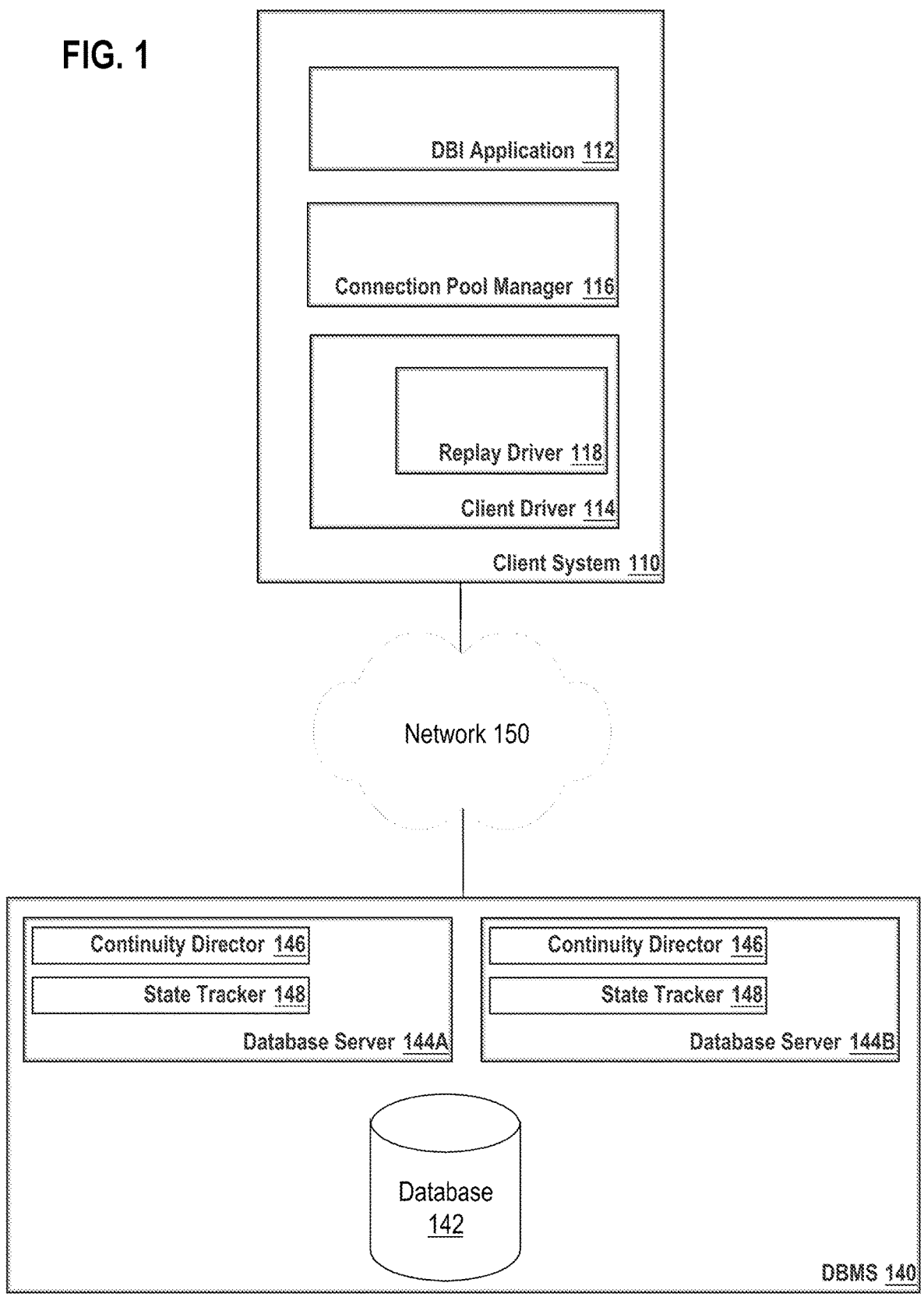
FIG. 1 is a block diagram that depicts a DBMS and a client computer system hosting DBI application interfacing with the DBMS, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques are described herein for performing session termination(s) for active sessions in response to a planned operation on the database server with which the sessions were established. The failover should have minimal effect on the applications that have initiated the sessions to perform database user calls on the DBMS. For the existing sessions, the planned operation institutes a drain timeout at the expiration of which the sessions are terminated. The DBMS marks the sessions for draining that are to be disconnected from an instance of a database server of the DBMS. The term "drain-marked session" refers herein to a session that has been marked for draining in response to a planned operation. The draining of sessions (disconnecting of the session(s) by the CPM) is preferred to the DBMS termination and subsequent failover. When a session is drained by the CPM, there is no need to rebuild a session. The techniques described herein describe the detection of points within a session lifecycle at which failover and draining are similar (when a session has no work in a request). Non-limiting examples are the begin or end boundaries of a request.

In an embodiment, the DBMS proactively performs termination of the session(s) that the DBMS expects not to drain based on determining that the request(s) of the sessions are likely to successfully failover to the active database server. Termination of a session may include a disconnection of the database connection when the session uses a dedicated connection. In an embodiment, in which a connection has multiple sessions, a disconnection of a session may not cause the disconnection of the connection until all of the sessions associated with that connection have disconnected. A reference to disconnecting/releasing a connection, unless stated otherwise, refers herein to disconnecting the last active session on the connection, if any, or disconnecting the session to which the connection is dedicated if the session is still active. Once all connections with the target database server are terminated, the planned operation may be performed on the target database server.

In an embodiment, the DBMS maintains a rules engine that executes rule instructions of a rule to determine whether the rule is satisfied for a drain-marked session. In order to apply a rule by the rules engine, the DBMS continues to track the drain-marked sessions that are not draining. If the drain timeout is reached before a drain-marked session is drained, the connection for the session is abruptly disconnected, which may be very disruptive to clients that made requests through the session.

To avoid the adverse consequences of an abrupt termination of sessions at the drain timeout, the rules engine may determine when, before the draining timeout expires, to terminate the drain-marked session for the triggered failover to have the best chances of success. In an embodiment, to make this determination, the rules engine identifies a rule and applies the rule to the drain-marked session using input data for the rule.

One example of input data for rules is raw statistics about session(s) with the DBMS. The raw statistics may be historical statistics captured for like sessions and/or raw statistics captured for the drain-marked session. The statistics may include the number of requests, time periods for the requests, and a number of various types of user calls within requests.

Another example of input data is the configuration of the DBMS and the client application. In particular, the availability and enablement of a failover technology may be used to make a determination under the rule(s) whether and when to terminate the drain-marked session(s). For example, when a failover feature such as (Transparent) Application Continuity is enabled, the DBMS may have a high-level of protection for calls when replayed. Other failover recovery features enabled with the DBMS may include Transparent Application Failover, Transaction Guard and others that are enabled on a session.

As another example, a user call may directly cause failover of the drain-marked session. At the beginning or end of a request, the user call may specify a begin request or end request boundary, respectively, or perform a connection test.

By executing an instruction of one or more rules on a session with the respective rule input data for the session, the DBMS may determine whether the session has reached a point when there is a request boundary, whether the current request is likely or unlikely to complete, whether the current request may become unreplayable (i.e., the user calls in the request, when replayed, will not produce the same result) in the future, and whether the session is currently idle among others. The term "termination point" refers to such a point in the session's lifecycle, at which a rule of the rules engine is satisfied, and the drain-marked session may be terminated.

The rules engine may maintain multiple rules to apply. If the execution of rule instruction(s) of a particular rule fails to yield a termination point for the drain-marked session, the rules engine may apply another rule. Accordingly, the rules may be prioritized by the rules engine to be applied in a particular order to detect a termination point.

The DBMS terminates the drain-marked session at a detected termination point (e.g., "suicides" the session), thereby inducing a failover. This process continues, gradually relocating all sessions from the instance ahead of the planned operation.

System Overview

FIG. 1 is a block diagram that depicts a DBMS and a client computer system hosting a DBI application interfacing with the DBMS, in one or more embodiments. Client system 110 is connected to database servers 144A-B of DBMS 140 through network 150. Although a single client system 110 is depicted, other embodiments may include more client systems. Similarly, other embodiments may include more or fewer database servers 144A-B and database 142.

In an embodiment, DBI application 112 is an application server, a mid-tier database application, and/or any other database-backed application that executes on computing devices of client system 110.

In an embodiment, DBI applications may interface with a DBMS using a Client-Driver on the client system. The "Database Client Driver" (or simply "Client-Driver" or "DCC") term refers to an application component that interfaces the application with a DBMS using the DBMS in a manner compliant with rules specified for the DBMS. For example, a compliant manner of interfacing may refer to the component having the ability to receive a notification from the DBMS about a disconnection-requiring planned operation and an ability to establish monitoring for determining a termination point in response to receiving the notification. A client component, such as a database client driver or a CPM, may not be fully compliant with the DBMS, if, for example, the component has been provided/developed by a different vendor than that the DBMS, or if the component is outdated and is not fully compatible with all the functions of a version of a DBMS with which the application is interfacing.

For example, client system 110 includes DBI application 112 that interfaces with DBMS 140 using Client-Driver 114. Client-Driver 114, in this example, may utilize connection pool manager 116 for connections with DBMS 140. Client-Driver 114 may interface with network interfaces of client system 110 to establish a connection with DBMS 140. Client-Driver 114 may communicate with DBMS 140 using database native calls. Connection pool manager 116 and/or DBI application 112 may communicate with DBMS 140 by issuing driver-specific calls to Client Driver 114, which would translate the calls into native calls to DBMS 140 over one or more established connections. Although connection pool manager 116 is depicted in FIG. 1 as being separate from Client Driver 114A, in other implementations, connection pool manager 116 may be part of Client Driver 114. The techniques described herein similarly apply to connection pool manager 116 whether or not connection pool manager 116 is part of Client Driver 114 or separate from Client Driver 114.

In an embodiment, DBMS 140 may itself initiate a communication (notification) with the client driver 114 to cause a particular action to be performed by client system 110. For example, a disconnection-requiring planned operation may be initiated for database server instance 144A, and one or more services of database server 144A may be migrated to another instance of the same database 144B by DBMS 140 or to another database that can offer the same service. DBMS 140 may issue one or more database events regarding the planned operation to the connected database client drivers of client systems. Client-Driver 114 may receive and parse such an event. An example of such events is FAN events.

Application Continuity System (Application Continuity) provides for session continuity of established sessions of a client system with a DBMS for planned and unplanned disconnection events. Application Continuity includes one or more components of DBMS 140 and the client system, such as one or more components of DBMS 140 and client system 110. State tracker 148 and continuity director 146 are examples of such components that may be part of DBS 144*a* and DBS 144*b*.

Other failover-related components (Application Continuity, Transparent Application Continuity Transparent Application Failover, Transaction Guard) and may be part of DBMS 140.

Opening a Database Connection

Figure 2:
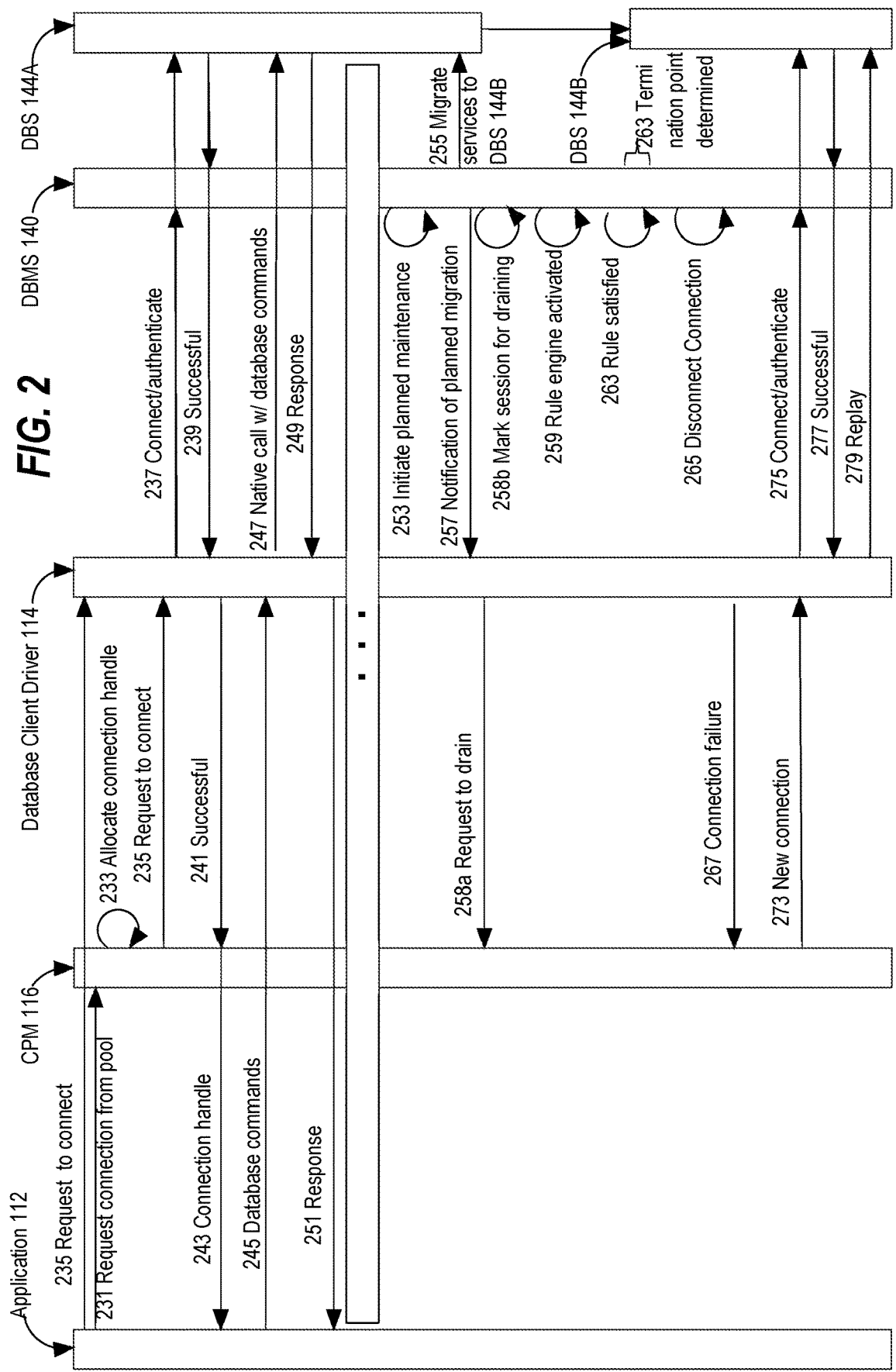
FIG. 2 is a sequence diagram that depicts detecting a safe point in a database connection and draining the database connection, in one or more embodiments.

FIG. 2 is a sequence diagram that depicts a process for failover, in one or more embodiments. At step 235, application 112 requests a client driver 114 to connect to database server instance (DBS) 144A of DBMS 140 for application 112 to issue one or more database user calls over the database connection. Alternatively, if application 112 utilizes a database connection pool managed by CPM 116, application 112 may request from CPM 116 a database connection to DBS 144A from the pool at step 231. If a pool has no connection available for application 112, at step 233, CPM 116 allocates a new handle for a new database connection and requests database client driver 114 to connect with DBMS 140 at step 235.

At step 237, database client driver 114 connects with DBS 144A of DBMS 140 regardless of whether application 112 or CPM 116 has requested the database connection. As part of a connection protocol, database client driver 114 may provide to DBMS 140 authentication/authorization information from application 112. Once the database connection is successfully established with DBS 144A, at step 239, DBMS 140 returns a response to database client driver 114, which may, in turn, propagate the response to CPM 116 or application 112 at step 241. Application 112 obtains, at step 243, the connection handle for the newly established database connection.

In an alternative embodiment, CPM 116 may already have a connection with DBMS 144A available in the managed connection pool. In such an embodiment, CPM 116 returns the connection handle for the available connection to application 112 and indicates that the connection is in-use.

In an embodiment, continuing with FIG. 2, at step 245, application 112, using the acquired connection, may issue various database user calls to database client driver 114 for DBS 144A. Database client driver 114 translates these user calls into native calls to DBS 144A and requests the execution of user calls at step 247. DBS 144A may respond to the native calls with the results of the execution, at step 249, which are propagated to application 112 at step 251. The database user calls may include one or more database statements of any type, such as DML (Data Manipulation Language), DDL (Data Definition Language), DCL (Data Control Language), TCL (Transaction Control Language) user calls for local or global transactions.

Application 112, as well as other applications, may open a number of connections with DBS 144A to request the execution of database user calls. At any point, the execution of the database user calls may be at different stages. Such stages may not be readily recognizable by DBMS 140 and may make a false impression on DBMS 140 that a connection is not in-use. Even for one database command (even for a whole transaction) that was sent over a connection that was completely executed with a result having been returned to an application, the application may need to issue an additional database command over the connection that depends on the result. Accordingly, the DBMS may not be able to arbitrarily disconnect a database connection without a possible adverse effect on the application.

The connection pool management may be provided by a third-party application server or application (as depicted Client System 110 of FIG. 1, as an example). In such an embodiment, the Client-Driver and DBMS only detect a request for a new connection. Neither the Client-Driver nor DBMS 140 can detect the borrowing from and release to the non-compliant connection pool. The pool management is not visible to the client driver or DBMS; thus, the discovery of request boundaries or connection tests may be the only way to detect that a connection is not any longer in use.

Initiating Termination of Database Sessions

In an embodiment, a planned operation requiring sessions to be disconnected may be initiated at a request of a database administrator (DBA) or automatically for load balancing. A planned operation may include an update of software or hardware components on one or more computing devices hosting a database server, and thus may require a restart of a database server or a service thereof. Accordingly, the maintenance may cause service(s) of the database server instance to be stopped for some time period, closing open connections, and preventing database command executions for applications that were connected with the database server instance. When more database instances are available, the work may drain or failover to other available instances. A rebalancing of work may similarly require releasing sessions at one database instance and reopening them at another database instance.

Continuing with FIG. 2, at step 253, a disconnection-requiring planned operation on DBS 144A is initiated, requiring that the session(s) with DBS 144A be disconnected. In an embodiment, to alleviate the consequences of the planned operation, DBMS 140 drains or fails over the database sessions to one or more computing devices that are not affected by the planned operation. DBMS 140 may determine that DBS instance 144b is available, and the affected service(s) may be relocated to this instance unless already present and running on DBS 144b. Such a database instance is also referred herein to as an "active database server" or "active instance." At step 255, DBMS 140 may request one or more services to relocate to the active instance, DBS 144B. If the services are already offered by 144B, the services may be stopped on 144A after the current session(s) are drained. The new connections are to be directed to use 144B.

To drain or failover the current session(s) over the affected connection(s), the sessions need to be closed, and the connections disconnected. At step 257, DBMS 140 may notify client-driver 114 about the planned relocation. For compliant CPMs and client-drivers, at step 258a, client driver 114 may mark sessions for draining and notify CPM 116 to drain the affected connection. Techniques to failover at safe points are discussed in U.S. application Ser. No. 15/803,644, entitled "Safe Release of Database Sessions for Planned Maintenance Operations," filed on Nov. 3, 2017.

Additionally, at step 258b, DBMS 140 marks sessions for draining, and the existing sessions on 144A will be drained or failed over during the allowed draining window. DBMS 140 starts monitoring these sessions to determine a termination point at step 259. At the time when a user call is received by DBMS 140, if that session is marked to drain and if that user call may satisfy a rule at step 263, then the rules engine is invoked to determine whether the session may failover.

Once drained or failed over, the application needs to reconnect with DBMS 144b to establish session(s) with the new database server. However, the planned operation has a drain time out, and any session that is not drained (has not encountered a safe point) by the expiration of the drain time out would be forcefully terminated.

Thus, DBMS 140 may apply one or more rules to detect a termination point. In an embodiment, when marked for draining, the rules engine is activated at the beginning of round trips from the application at step 259. In another embodiment, the rules engine is only invoked when it is possible that a rule would be satisfied. For idle sessions, the rules engine may be activated using an event that is registered when draining is initiated. Once initiated, at step 263, the rules engine of DBMS 140 may continuously monitor requests over database sessions such as when user calls are received, or at events, until one or more of the set of rules are satisfied, and only then may terminate the database session and fail the session over to a new instance.

Sessions are marked to drain-marked sessions when planned maintenance starts or by other processes such as a load balancer. Unlike hard failure at the end of the drain timeout, terminating sessions at the corresponding rule-satisfied termination points minimizes the impact on the connected application(s) as these are places where failover is enabled and is expected to succeed.

Initiating Rules Engine for Determining Termination Point

Figure 3:
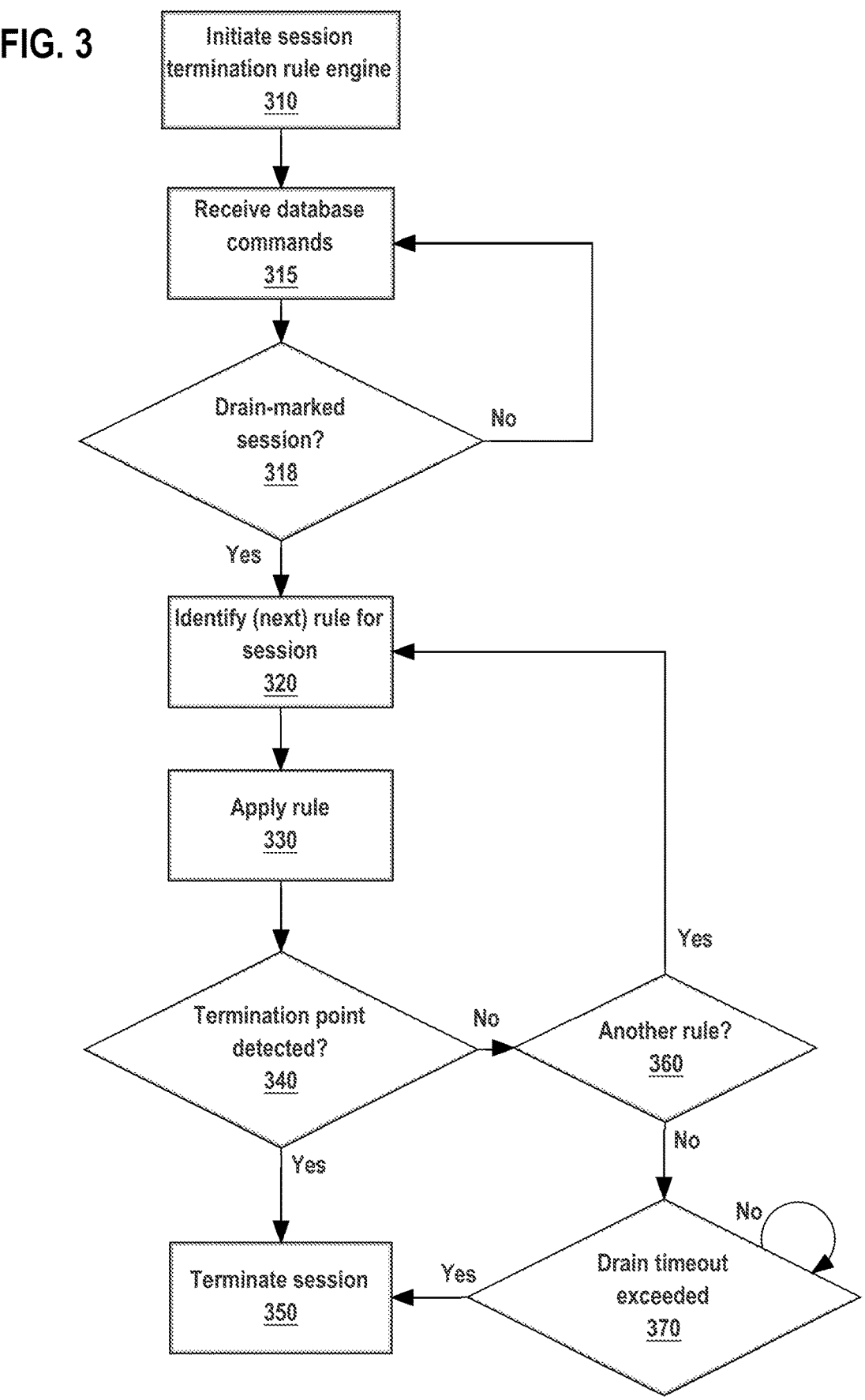
FIG. 3 is a flow diagram that depicts a process for detecting a termination point for a drain-marked session, in an embodiment.

FIG. 3 is a flow diagram that depicts a process for detecting a termination point for a drain-marked session, in an embodiment. At step 310, the rules engine is initiated on a database server instance for a planned operation. At step 315, DBMS 140 receives a user command over a session with the database server instance. The process determines whether the session for which the command is received is a drain-marked session by DBMS 140. For the drain-marked session at step 318, the rules engine applies rule(s) based on the call that triggered the rule. When a rule is satisfied for the drain-marked session, a termination breakpoint is detected. If the received database command is not received over a drain-marked session, then the process proceeds to step 315 to receive the next database command.

At step 320, a rule is identified for determining a termination point for failing over the drain-marked session. In one embodiment, rules are identified and selected based on the context of the received database command. Non-limiting examples of contexts are begin or end request boundaries, a connection test, or a matching database command for which the rule is configured (e.g., SQLHASH). Rules may also be prioritized based on their respective historical success for determining a termination point at which the session failover is successful, in an embodiment. Thus, the rule with that context and/or a higher priority rule is selected first. The rules engine is extensible and may be configured with new rules.

Session Statistics and Metrics

At step 330, the identified rule is applied to the drain-marked session by executing the rule's instruction(s). The satisfaction of the rule indicates a detection of a termination point in the session.

Figure 4:
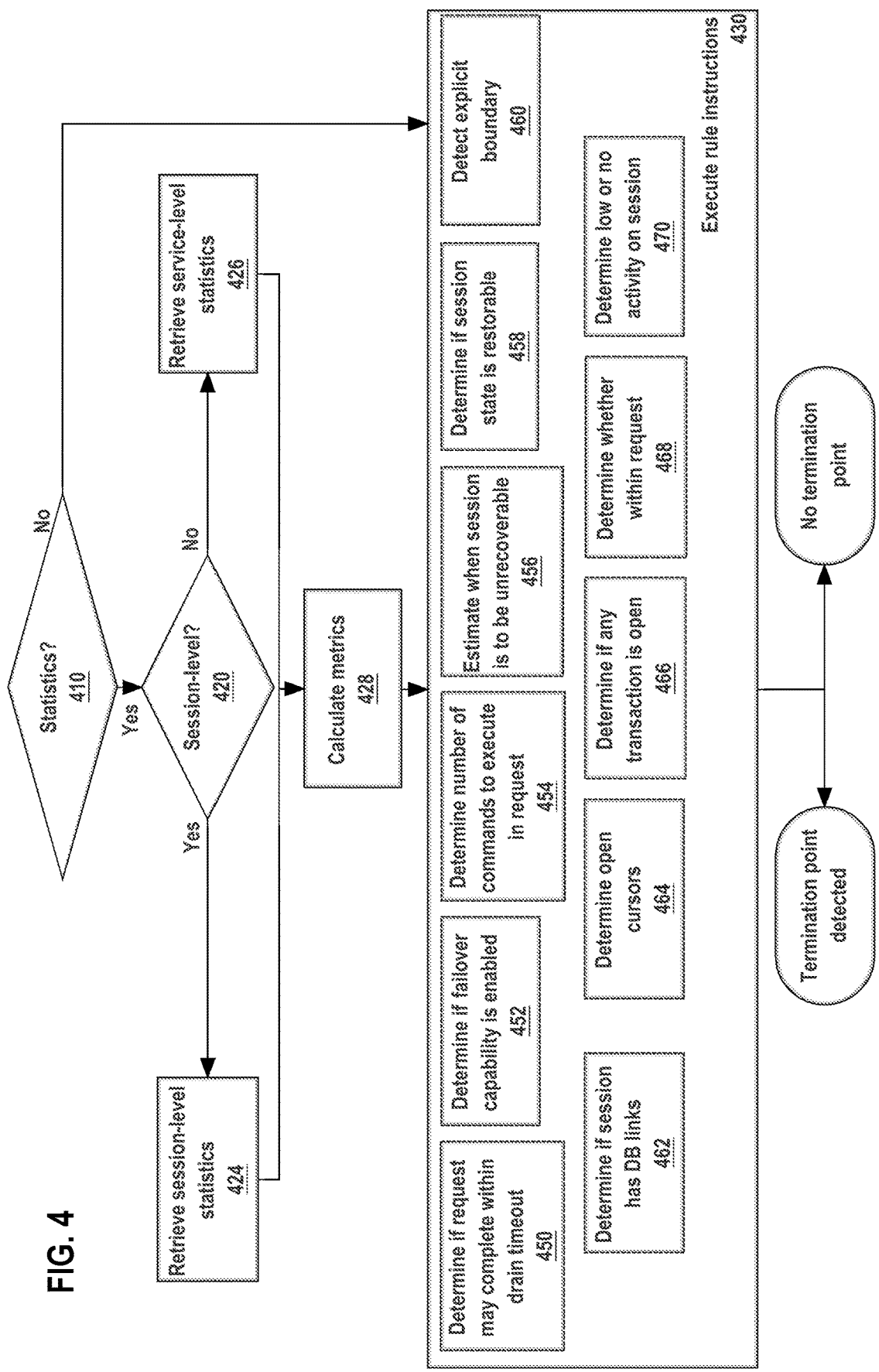
FIG. 4 is a flow diagram that depicts a process for applying a rule to a drain-marked session for detecting a termination point in the session, in an embodiment.

Once the rule is selected for the received commands over the drain-marked session at step 320, the application of the rule takes as input data the received database command(s) (and the context thereof, e.g., begin or end request boundaries or a connection test), raw statistics and/or metrics calculated therewith. Application of the rule on the input data determines whether a termination point is detected, and the drain-marked session is to be terminated. FIG. 4 is a flow diagram that depicts a process for applying a rule to a drain-marked session for detecting a termination point in the session, in an embodiment. One or more steps of FIG. 4 are executed as part of step 330 of FIG. 3.

At step 410, DBMS 140 determines whether the selected rule at step 320 requires statistics-based input data. If no statistics is required as input data to the rule, the process proceeds to step 430 to execute rule instructions. Otherwise, For statistics-based rules, DBMS 140 captures raw statistics about the drain-marked session. DBMS 140 may initiate the capture of the raw statistics related to the session when the session is marked for draining.

In addition to the current raw statistics for the session, DBMS 140 may obtain historical raw statistics. The historical raw statistics are one or more numerical representations that characterize a session when the request(s) of the session have previously been completely and successfully executed. For example, DBMS 140 may obtain historical statistics about when, on average, (how many requests later) in the session lifecycle the received database command(s) disable failover features (thus, preventing a possible failover) to have the rule engine determine whether the current drain marked session should be terminated now or should proceed to wait for another request within the session.

In another example, if the drain-marked session is executing requests for a particular batch of queries (e.g., a recurring database job), this particular batch may have been executed before by DBMS 140. DBMS 140 may have captured, and stored raw statistics about the protection in the current drain-marked session and optionally, in other previous sessions, and this captured raw statistics may accurately characterize the sessions for the particular batch. Accordingly, DBMS 140 may compare the current raw statistics captured at a point in the lifecycle of the session with the historical raw statistics of that session and/or with other sessions' statistics to estimate the expected future behavior of the session.

At step 420, DBMS 140 determines whether session-level statistics exist for the current session or whether the statistics have to be obtained from the service-level raw statistics, in an embodiment. If, the necessary for the rule, session-level raw statistics exists for the drain-marked session, DBMS 140 may retrieve this statistics at step 426 and use in the possible determination of the termination point.

In some instances, no session-level raw statistics are recorded for a particular type of session-level statistics of the drain-marked session required by the identified rule. For example, if the session-level statistics are not be retained due to the memory cost, instead, service-level and/or server instance-level statistics are maintained, collectively referred herein to as "service-level statistics." For such examples, DBMS 140 may retrieve service-level, rather than session-level, raw statistics at step 426, in an embodiment. The service-level raw statistics represent the numerical measure of the request(s) that have been serviced by the same database service. The service and thus may be representative of the drain-marked session's request(s). Therefore, the service-level statistics may still provide an indication of the expected execution of request(s) within the drain-marked session.

Continuing with the example of a batch query execution, if a particular type of statistics (e.g., cumulative count of requests) has not been recorded for the current and/or previous executions of the batch queries, DBMS 140 may retrieve the missing raw statistics from the batch job service-level raw statistics and use it as the historical raw session-level statistics.

The following are non-limiting examples of raw current and historical statistics that may be obtained for the drain-marked session:
  drain timeout for the planned operation,
  stop option for the planned maintenance,
  timestamp when the current session connected,
  timestamp when the current request started,
  timestamp when the session is marked to drain,
  request-related statistics at the time of the drain marking:
    cumulative begin requests (historical and current session) —number of begin request boundaries received in the session,
    cumulative end requests (historical and current session) —number of end request boundaries received in the session,
    cumulative user calls in the request (historical and current session), cumulative user calls that can be interrupted and successfully failed over that are referred to herein as "protected user calls" (historical and current session), time duration of the current request, and time duration for executing protected user calls(s) in a request (historical and current session), number of transaction commits (historical and current session), number of user calls (historical and current session), number of user calls in a transaction (historical and current session), number of failovers attempted (historical and current session), and time duration for replaying user calls after a failover (historical).

If any of the above-mentioned raw statistics are not recorded on the session level, the corresponding service-level statistics may be obtained.

In one embodiment, the obtained raw statistics are directly used by one or more rule instructions of rules at step 430 of FIG. 4.

Alternatively or additionally, at step 428 of FIG. 4, DBMS 140 calculates metric(s) based on the obtained raw statistics.

A calculated metric represents a numerical aggregation that characterizes the current or expected behavior of the session. Non-limiting examples of metrics include one or more of:

Request count in the drain-marked session, which may be the minimum of cumulative begin and end request(s) received in the session;

User calls to request ratio, which may be calculated by dividing the cumulative number of user calls in the request(s) of the session by the request count of the session;

Protected user calls to requests ratio, which may be calculated by dividing the cumulative number of protected user calls received in the request(s) of the session by the request count;

Request duration, which may be calculated by subtracting the timestamp for the connection of the drain-marked session from the current timestamp and then dividing the difference by the request count in the session. Alternatively, the request duration may be calculated by dividing the total time spent in the request(s) by the request count. The value of 1 may be assigned if no request was sent in the drain-marked session.

Protected user calls ratio, which may be calculated by dividing the cumulative number of protected user calls by the cumulative number of user calls in the request (s).

Protected command duration in a request, which may be calculated by multiplying the protected user calls ratio with the request duration. Alternatively, the protected command duration in a request may be calculated by dividing the cumulative time of protected user calls by the request count.

Percentage of drain timeout remaining, which may be calculated by subtracting the timestamp when the session is marked to drain from the current timestamp and dividing the difference by the drain timeout period for the planned operation.

Applying Rule(s)

The raw statistics and/or metrics of the drain-marked session are used by DBMS 140's rules engine when applying a rule to the drain-marked session to detect a termination point, in an embodiment. Application of each rule includes execution of one or more rule instructions of the rule to determine a particular aspect of the behavior of the drain marked session, in an embodiment. FIG. 4's step 430 depicts example rule instructions, one or more of which may be executed when applying a particular rule to the drain marked session. For rules where no user call is received, rather the session is idle, the previously accumulated metrics are used.

Example Rule: Idle Session

In an embodiment, an application of a rule may determine that the drain-marked session is not draining, while no command is requested over the session. Thus, the session is not progressing and may be considered idle when no or little activity is detected in the session since the session was marked for draining. The idle session rule is most useful for database sessions that are configured with no connection, such as an idle system using shared servers. The sessions with no connections can be removed without waiting for the drain timeout. The idle session rule is most often invoked by the process that starts when draining starts. It can also be invoked immediately when DBMS 140 detects sessions with no connections.

To satisfy the idle session rule, DBMS 140 executes one or more of the below rule instructions to detect the appropriate behavior of the drain marked session:

Perform step 470 using the percentage of drain timeout metrics to determine whether a particular portion of drain timeout has passed without any command being received over the session. For example, the step may determine that the percentage of drain timeout remaining is less than 50%, and no user command has been received over the session; thus, the session is currently idling.

Perform step 452 to determine whether a failover capability is enabled for the drain-marked session. For example, the performance of this step may determine that Application Continuity is enabled for the drain-marked session. Thus, the drain-marked session will be restored (or at least attempted to be restored) on the active database server instance after the failover due to the termination. The failover capability may include the transaction guard feature, which protects the integrity of an open transaction when an interruption such as a failover occurs that prevents the transaction from committing. The transaction guard feature prevents (or at least attempts to prevent) corrupted transactions due to termination of the session while failing over. Another failover capability is transparent application failover, which protects read-only user calls (SELECT statements) and performs a replay of those user calls after the failover if necessary. Thus, DBI application 112 read state can be recovered after the failover onto the active database server.

For example, when performing the above-mentioned steps, DBMS 140 may determine that the failover capability is enabled, and the session is idle. Therefore, the rule is satisfied, and the termination point is detected for the drain-marked session. In another example, DBMS 140 may determine that the failover capability is enabled. However, the session is not idle; therefore, the rule is not satisfied, and no termination point is detected.

Example Rule: Implicit Request Boundary

In an embodiment, DBI application 112 may be at a logical end of one unit of work, and before the next unit of work starts, DBMS 140 (and or client driver 114) may detect this end boundary without any explicit markers being present in the request. The application of the rule may cause the determination of the implicit request boundary and other behavior of the drain-marked session, and thereby detection of a termination point. This rule is an example of a named rule that is triggered by a particular context of the received user call.

To satisfy the implicit boundary rule, DBMS 140 executes one or more of the below rule instructions to detect the appropriate behavior of the drain marked session:

Perform step 458 to determine whether a session state is restorable. Using the session state tracking feature, as described in the U.S. application Ser. No. 16/147,314 "Session State Tracking," filed on Sep. 28, 2018, DBMS 140 may obtain the session state of a session at any point in the session's lifecycle. If the session state summary for the session state has no modification state for the non-restorable session state summary of the session state, then the drain-marked session is restorable at this point in the lifecycle.

Perform step 452 to determine whether a failover capability is enabled for the drain-marked session. For example, the performance of this step may determine that Application Continuity is enabled for the drain marked session. Thus, the drain-marked session will be restored (or at least attempted to be restored) on the active database server instance after the failover due to the termination. The failover capability may include the transaction guard feature, which protects the integrity of an open transaction when an interruption such as a failover occurs that prevents the transaction from committing. The transaction guard feature prevents (or at least attempts to prevent) corrupted transactions due to termination of the session while failing over. Another failover capability is transparent application failover, which protects read-only user calls (SELECT statements) and performs a replay of those user calls after the failover if necessary. Thus, DBI application 112 read state can be recovered after the failover onto the active database server.

Perform step 462 to determine whether any database links exist.

For example, if performing the above-mentioned steps, DBMS 140 may determine that a session state is recoverable, failover capability is enabled, no open transaction, and no database links exist. Thus, the rule is satisfied, and a termination point is detected for the drain-marked session. In another example, if the session is determined to be recoverable for the same request for which the draining request has been received, then the rule is satisfied, and a termination point is detected for the drain-marked session. In yet another example, if no implicit boundary is detected, the rule is not satisfied, and thus, no termination point is detected.

Example Rule: Explicit Request Boundary

In an embodiment, DBMS 140 determines that a request boundary is present without detecting an implicit boundary. Unlike an implicit request boundary, the begin/end request boundaries are explicitly marked by CPM 116 when borrowing and returning from the connection pool and/or by DBI application 112. Client system 110 embeds request boundaries within the user calls to indicate the units of work requested for DBMS 140 to perform are independent of each other. Such explicit boundary marker(s) are detected within a request and indicate that the request is at its end or at its beginning. This rule is another example of a named rule that is triggered by a particular context of the received user call.

The application of the rule may cause the determination of the explicit request boundary and other behavior of the drain-marked session, and thereby detection of a termination point.

To satisfy the explicit boundary rule, DBMS 140 executes one or more of the below rule instructions to detect the appropriate behavior of the drain marked session:

Perform step 460 to determine whether a request boundary is received. Since the session should have been gracefully drained by CPM 116 on the explicit request boundary, determine whether the drain marked session is indeed not draining. In an embodiment, using the percentage of drain timeout metric, DBMS 140 determines whether a significant portion of drain timeout has lapsed (e.g., greater than 25% or a set number of requests that have passed starting at zero). Additionally or alternatively, using cumulative end or begin requests metric, DBMS 140 determines whether the explicit boundary is the first request after marking the session to drain and, thus, CPM 116 should be given the opportunity to drain gracefully. When the set number of requests that have passed is zero, the explicit request boundary rule applies immediately, in an embodiment.

Perform step 452 to determine whether a failover capability is enabled for the drain-marked session. For example, the performance of this step may determine that Application Continuity is enabled for the drain marked session. Thus, the drain-marked session will be restored (or at least attempted to be restored) on active database server instance 144b after the failover due to the termination. The failover capability may include the transaction guard feature, which protects the integrity of an open transaction when an interruption such as a failover occurs that prevents the transaction from committing. The transaction guard feature prevents (or at least attempts to prevent) corrupted transactions due to termination of the session while failing over. Another failover capability is transparent application failover, which protects read-only user calls (SELECT statements) and performs a replay of those user calls after the failover if necessary. Thus, DBI application 112 read state can be recovered after the failover onto the active database server.

For example, when performing the above-mentioned steps, DBMS 140 may determine that an explicit request boundary has been received for the second or later request, failover capability is enabled, and the drain timeout has been partially exhausted, then a termination point is detected for the drain-marked session. In a similar example, the rule may be satisfied even if the request detected is the first explicit request in the drain marked session, but significant time has passed (e.g., over 50% of the drain timeout). In another example, the rule may not be satisfied if the first request's explicit boundary is detected, and less than 25% of the drain timeout has passed. In such an example, CPM 116 may be draining gradually and deallocation of the session objects, and thus the disconnection may be taking a longer time but could succeed without the termination.

Example Rule: Request Exceeds Draining Timeout

In an embodiment, DBMS 140 determines that the session is currently executing a request. CPM 116 may not be draining the drain-marked session because the session is still executing a request. Thus, it is probable that when the request is completed, the session may gracefully drain. This rule is an example of a rule that may be triggered for any user call received at DBMS 140. In one example, the user call is determined not to be in a transaction.

In an embodiment, DBMS 140 estimates whether the request is not going to complete before the drain time out expires. If the request completes within the drain timeout, then DBMS 140 may expect the session to drain gracefully. However, if the request is not expected to complete before the drain timeout and will be terminated by the drain timeout, the consequences to DBI application 112 are unpredictable. Thus, DBMS 140 may determine to terminate before the drain timeout expires according to this rule.

Additionally or alternatively, DBMS 140 may determine the likelihood of whether the future user calls in the request are not going to be protected user calls. Stated differently, DBMS 140 determines whether the request is expected to execute user calls that will make the session's user calls unreplayable (unprotected user calls). Accordingly, DBMS 140 may terminate the session before such an unreplayable point to increase the chances of the successful failover for DBI application 112. Conversely, the request may have failover disabled at this point due to a non-protected user call, but the failover is expected to enable at a future protected user call based on the statistics.

To satisfy the example rule, DBMS 140 executes one or more of the below rule instructions to detect the appropriate behavior of the drain marked session:

Perform step 468 to determine whether the drain marked session is within a request. In an embodiment, DBMS 140 receives an explicit begin request boundary and has not received the corresponding end request boundary. Alternatively, DBMS 140 determines that no implicit end boundary has been detected for the request. In another embodiment, DBMS 140 determines that the session activity is one continuous request, and no boundary has ever been received throughout the lifecycle of the session for executing user calls.

Perform step 454 to determine whether the upcoming user calls in the request are likely to complete before the drain timeout expires. In an embodiment, DBMS 140 calculates a metric for the estimated time for the request to execute and then compare it with the remaining time period until the drain timeout expiration.

For example, DBMS 140 calculates the following one or more metrics based on the existing metrics and raw statistics:

Remaining drain window, which may be calculated by subtracting the timestamp when the request started from the expected drain time out expiration timestamp, Number of calls remaining in the request, which may be calculated by subtracting the cumulative user calls in the current request from the user calls per request metric, Expected time left after the request execution, which may be calculated by dividing the request duration by the number of calls remaining in the request resulting in the duration for the remainder of the request and subtracting the result from the remaining drain window metric Expected duration for protected user calls after the request execution, which may be calculated by dividing the request duration by the number of user calls by the amount of time before a user call is received that will cause the request to disable failover and thus, the replay.

If the calculated expected time left after the request execution or time to disable metric is negative, the request is likely not to complete before the expiration of the drain timeout. Otherwise, the request is likely to complete before the expiration of the drain timeout.

Perform step 456 to determine whether or estimate when the session's request(s) may become unreplayable due to receipt of unprotected command(s) within the request. In an embodiment, DBMS 140 calculates the metric for estimating the likelihood of the session's request(s) becoming unreplayable.

For example, DBMS calculates the following one or more metrics based on the existing metrics and raw statistics:

Remaining drain window, which may be calculated by subtracting the timestamp when the request started from the expected drain time out expiration timestamp, Number of calls remaining in the request, which may be calculated by subtracting the cumulative user calls in the current request from the user calls per request metric, Number of user calls till unprotected command metric, which may be calculated by subtracting the cumulative protected user calls statistics for the session from the protected user calls per request metric, Remaining duration for protected user calls in request metric which may be calculated by multiplying the protected command duration in a request metric with the division of the number of calls remaining in the request metric by the protected user calls to request ratio metric, Duration till unreplayable metric, which may be calculated by subtracting from the remaining drain window metric the remaining duration for protected user calls.

If the calculated duration till the unreplayable metric is negative, the request is likely to become unreplayable before the expiration of the drain timeout. Otherwise, the request is likely to stay recoverable before the expiration of the drain timeout.

Perform step 466 to determine if any transaction is open. If the request has a transaction open, in an embodiment, DBMS 140 determines the likelihood of the transaction committing before the drain time out. The likelihood may be based on a transaction-related metric, such as the transaction duration metric for the request.

Perform step 452 to determine whether a failover capability is enabled for the drain-marked session. For example, the performance of this step may determine that Application Continuity is enabled for the drain marked session. Thus, the drain-marked session will be restored (or at least attempted to be restored) on the active database server instance 144*b* after the failover due to the termination. The failover capability may include the transaction guard feature, which protects the integrity of an open transaction when an interruption such as a failover occurs that prevents the transaction from committing. The transaction guard feature prevents (or at least attempts to prevent) corrupted transactions due to termination of the session while failing over. Another failover capability is transparent application failover, which protects read-only user calls (SELECT statements) and performs a replay of those user calls after the failover if necessary. Thus, DBI application 112 read state can be recovered after the failover onto the active database server.

For example, based on performing the above-mentioned steps, DBMS 140 may determine that no detection point is detected because the request is expected to complete before the expiration of the drain time out. As another example, DBMS 140 may determine that a termination point is detected because the request is likely to become unreplayable, and there is no transaction open.

Example Rule: Failover Feature Enabled

In an embodiment, DBMS 140 determines that a termination point is detected based on a particular failover feature being enabled. Such a rule may be identified to be applied to a drain-marked session when no other rule has succeeded in detecting a termination point.

To satisfy the example rule, DBMS 140 executes one or more of the below rule instructions to detect the appropriate behavior of the drain marked session:

Perform step 452 to determine whether a failover capability is enabled for the drain-marked session. For example, the performance of this step may determine that transparent application failover, which protects read-only user calls (SELECT statements) and performs a replay of those user calls after the failover if necessary, is enabled. Thus, DBI application 112's read state can be recovered after the failover onto the active database server. The failover capability may include the transaction guard feature, which protects the integrity of an open transaction when an interruption such as a failover occurs that prevents the transaction from committing. The transaction guard feature prevents (or at least attempts to prevent) corrupted transactions due to termination of the session while failing over. Another failover capability is Application Continuity. When enabled for the drain marked session, the drain-marked session will be restored (or at least attempted to be restored) on the active instance after the failover.

Perform step 466 to determine if any transaction is open.

Perform step 454 to determine whether the upcoming user calls in the request are likely to complete before the drain timeout expires. In an embodiment, DBMS 140 calculates the metric for estimated time for the request to execute.

For example, DBMS calculates the following one or more metrics based on the existing metrics and raw statistics:

Remaining drain window, which may be calculated by subtracting the timestamp when the request started from the expected drain time out expiration timestamp, Number of calls remaining in the request, which may be calculated by subtracting the cumulative user calls in the current request from the user calls per request metric Expected time left after the request execution, which may be calculated by dividing the request duration by the number of calls remaining in the request and subtracting the result from the remaining drain window metric Expected duration of protected user calls after the request execution, which may be calculated by dividing the request duration by the number of user calls by the duration before the request reaches a non-protected user-call (which may not disable a failover feature when captured but may not be replayable).

If the expected time left after the request execution is negative, the request is likely not to complete before the expiration of the drain timeout. Otherwise, the request is likely to complete before the expiration of the drain timeout.

For example, if performing the above-mentioned steps, DBMS 140 determines that the request is not going to complete before the expiration of the drain time out, and the failover is likely to succeed, then a termination point is detected. In another example, if the request has an open transaction that may complete before the drain time out expiration, the DBMS 140 may determine that no termination point is detected. In a different example, if the transaction is open, but the transaction guard is enabled, and the request will exceed the timeout, DBMS 140 may determine that a termination point is detected.

Other Rules and Prioritization of Rules

In an embodiment, one or more other rules may be configured using the rule instructions described in steps 450-470 of FIG. 4, or new rule instructions based on raw statistics and metrics may be added to the rules engine. When the rules engine applies multiple rules, the rules engine determines which rule to apply after the initially selected rule is not satisfied, and a termination point has not yet been detected.

Referring to FIG. 3, when the initially identified rule at step 330 is not satisfied and failed to detect a termination point, the process proceeds to step 360 to determine if another rule may be applied for detecting a termination point. If another rule exists, the rules engine determines which rule to select at step 320.

The rules engine may prioritize the application of the rules-based on the user call that was received together with their historical success for a particular session (sessions from a particular client application) or a particular type of session (sessions for batch execution). In another embodiment, the rules may be prioritized based on their expected effect on DBI application 112, if satisfied. The termination point for different rules may have a different probability of successful failover for the drain-marked session. For example, the rules engine may prioritize the explicit boundary rule above the implicit boundary rule because, at an explicit boundary, DBI application 112 has explicitly indicated that its unit of work has been completed. In another example, the request exceeds the draining time rule may be prioritized lower than any of the boundary rules. In yet another example, the failover feature enabled rule may have the highest priority because replay will not be possible if later calls are allowed to be issued by the application.

If any of the rule applications detect a termination point, the session is terminated at step 350. Otherwise, if at step 360, no other rule remains to be applied by the rules engine, then, at step 370, the session is executed until the drain time out expires. Alternatively, the rules are continuously and repeatedly applied until a rule is satisfied at step 340 or the drain timeout expires, at step 370. At the expiration point, the process proceeds to step 350 and terminates the session.

Session Disconnection

Referring to FIG. 2, the database session may be disconnected at step 265. Disconnection of a session may include a disconnection of the database connection when the session uses a dedicated connection. The termination may be performed by "self-suicide" or simply "suicide," which is a termination that the draining database server instance, 144a, interprets this as a session failover and fails over to an active database instance, 144b. In one embodiment, in which a connection is shared between multiple sessions, a disconnection of a session may not cause the disconnection of the connection unless the disconnected session is the last active session on the connection. The reference to disconnecting/releasing a connection, unless stated otherwise, refers herein to disconnecting the last active session on the connection, if any, or disconnecting the session to which the connection is dedicated if the session is still active. In one embodiment, in which a session is shared between connections, the connection using that session is disconnected until none of the other shared connections are active.

When the disconnection occurs at a termination point determined by the satisfaction of a rule, the application may not be disturbed and gracefully handles the disconnection with no interruption to the application using the failover feature that is enabled.

Interruption and Re-Establishing of Session with New Database Server

In an embodiment, continuing with FIG. 2, client driver 114 detects the interruption in the session at step 267. Client driver 114, at step 267, requests listeners which provide a connection to new database instance/server 144B at step 273, thereby initiating the transition of the session to database server 144B. Upon successful connection at steps 275 and 277, client driver 114 initiates replay over the new session with database instance/server 144B at step 279 to rebuild the session state with continuity director 146 on database server 144B or other failover solution (Transparent Application Failover) to match the session and transaction state at the termination point.

At the establishment of the session, DBI application 112 may invoke the same user calls as would have been performed by DBI application 112 when any regular session is newly established. This may include user calls to perform a SELECT command, open transaction(s), and other user calls that remained to be issued in the request that failed over.

In an embodiment, continuity director 146 records the newly established initial state to compare with the previous initial state. Continuity director 146 may compare the initial state by generating a session state summary using the techniques described above.

Verification for a match of initial states ensures that any previous initial state that existed in a newly borrowed session from the session is correctly rebuilt. The initial state comparison verifies that the starting state, at which the rest of the session state is rebuilt, is exactly the same initial state as in the original session. In an embodiment, the continuity director 146 verifies that the initial session state fully matches the original request's initial state by matching the new initial state's summary with previously generated session state summary at the beginning of the request. For example, the signatures and state flags of the summaries may be compared and to determine whether a match exists. If not matched, continuity director 146 will raise an error that is received by the replay driver. DBI application 112 may be notified about the mismatch. Additionally or alternatively, if mismatched, replay driver 118 may re-establish a new session with DBMS 144b, and continuity director 146 may re-perform the verification.

Rebuilding Initial Session State

Once replay has started, the state summary passed to continuity director 146 in the replay context from the replay driver 118 may be used to ensure that the client restorable states continue to match. In such an embodiment, replay driver 118, along with continuity director 146, restores the session state of the restored session to the point at which the termination (suicide) occurred. In an embodiment, continuity director 146 uses the session state summary to determine whether which, if any, client restorable and/or server restorable aspects of the state are correctly restored.

Several techniques exist for restoring the initial state before replay starts. In an embodiment in which a client-restorable aspect of the state is to be restored only, the replay driver 118 restores the previously recorded client-visible states that it maintains, and generates the appropriate command through the new session. The replay driver generated command is issued, causing the restoring of the session aspect of the session. Thus, a client restorable session aspect is restored by replay driver 118 to establish the same state aspect on the new session. For example, the replay driver 118 may build the attribute-value pair for the session aspect in the form of a command such as the "ALTER SESSION" command, or generate the command based on the retrieved the attribute-value pair.

In an embodiment in which a restorable aspect of the state is to be restored for the initial state, the replay driver 118 requests that a template is restored. The session state tracker retrieves the template and restores one or more attribute-value pairs for the restorable aspect to restore the initial session state aspect on the new session. The replay driver 118 maintains the identifier of the session template that includes the information for the initial state. To restore the initial state, replay driver 118 requests continuity director 146 to retrieve the template with the identifier from database 142 using techniques described above and apply the session attribute-value pairs included in the template to the new session. To apply a session attribute-value pair to a new session, session state tracker 148 invokes each state callback for the component of DBMS 144b that corresponds to the session attribute with the session attribute-value pair.

Continuing with the initial state restore, in an embodiment, the template returned to the session state tracker 148 is evaluated and comprises multiple session template identifiers for the initial starting point, and thus, multiple templates are applied by the session state tracker 148 to restore the initial session state(s). Replay 118 driver requests a template to restore at the initial state point of a session to re-build the appropriate session state (for multiplexing and at session borrowing from the session pool). DBMS 140 expands the hierarchy itself by applying templates in the appropriate hierarchical order. Within the session state tracker 148, if templates have a hierarchical order, then the templates are applied in reverse order of hierarchy from a lower layer to a higher layer. Stated differently, when the session state tracker 148 determines that the template identifier received resolves to multiple hierarchical templates for the initial starting point, session state tracker 148 applies the session templates. Such an application in the order of the hierarchy ensures that a higher component layer template can overwrite a session attribute value, also present in a lower component.

Rebuilding the Session

After the initial state is restored and verified, the continuity director may perform a replay of the recorded user calls. The continuity manager restores a session state by replaying the user calls recorded from the starting safe point until the interruption of the session. Client driver 114 may request replay driver 118 to replay. Replay driver 118 identifies the safe point in the replay context from which to start the replay of commands and, if necessary, restores the session state at the safe point on the new session using techniques described herein. The replay driver initiates the replay of the captured commands by requesting DB server 144B to execute the commands in the same order as the commands were captured. The replay driver receives the status for the request. In an embodiment, the execution of replay commands occurs using the same techniques as for rebuilding the initial state, and verification point state summaries are similarly generated by state tracker 148.

Additionally, when the state summary for a verification point is returned to replay driver 118, replay driver 118 compares the session state summary with the session state summary stored in the replay context associated with the verification point. For example, one or more session state signatures and/or session attribute signatures may be compared. If the summaries match, then the replay can proceed, and successful status is returned. Otherwise, if the summaries fail to match, then an error status is returned.

Implicit Boundaries

Since the Continuity Manager may insert implicit boundaries where the state is restorable, the replayable set of user calls may be reduced if an unplanned event occurs. In this embodiment, with the implicit boundary rule (safe point), planned failover may be induced at the new boundary, so there is a lesser queue of user calls to replay. Conversely, for an unplanned failover, if implicit boundaries are frequent such as inserted per each statement, then rather than replaying a database request that may include multiple statements, each statement may be treated as a request, and only a single statement may need to be replayed for recovering the session state.

Database Interfacing (Client) Application and Logical Connections to Database Management System A client driver for a database interfacing (DBI) application maintains a connection pool, which includes connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to DBI applications for processing requests. As work completes, connections are returned to the connection pool and are available for subsequent DBI applications to borrow from the pool.

A DBI application is any logic running on one or more computing devices that uses a database connection to retrieve information from the database. The retrieved information may be presented or displayed to a user of the application or send to a client application. For example, the DBI application may be accessed from a browser, where the DBI application receives input from the user and presents information to the user. The DBI application may be an application that is accessed through a web portal, over a network, by the user, an application that is installed on a machine of the user, or an application that is distributed among multiple machines.

In one example, a DBI application issues a request to a DBMS for data from a database. The request may or may not be sent in response to user input. The DBI application selects a free connection from amongst the freed connections in the pool to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The DBI application sends the client request on the selected connection to a database instance, and the database instance accesses a database to handle the request. The database server processes the request by retrieving or modifying data in the database or by retrieving or modifying the data in a cache of data from the database. The database server establishes a state for the database session as the database server processes the request.

DBI applications may be categorized into different classes based on their session state management—stateless, pre-set state, and heavy-state applications. When a stateless application obtains a connection from the pool, the stateless application doesn't apply any initial state to the established session. It has no expectations of a preserved state when the connection is returned to the pool.

A pre-set state DBI application may apply an initial state to a newly formed session over an obtained connection. However, the state change to the session due to the execution of user calls over the session can be reset without adverse effect to the DBI application.

The third type of DBI applications is heavy-state applications. A heavy-state application relies on the state of the session to correctly and successfully execute user calls over the database session. If the session state is not correctly rebuilt, then an error or wrong response may be generated for the DBI application.

For example, many mid-tier servers are heavy-state applications that provide database instance connections to client applications that request information from a database. A mid-tier server is a server that provides access to one or more database servers, distributes work to one or more database servers, or manages connections to one or more database servers. In one example, an Oracle® Fusion® Application is specially configured to retrieve data from an Oracle® database and display the information to a user of the Fusion® Application.

Although DBI applications rely on the states of database sessions to different degrees, neither a client driver nor a database server may be able to determine as to which type of DBI application has established a database session with a database. Accordingly, if the client driver or the database server has a limited ability to recover the state of a database session for the applications, neither can presume that it is a stateless application and the state can be recovered, or it is a heavy-state application, and no state can be recovered. To address this shortcoming in the recovery, load-balancing, and planned maintenance technology of the database management system, techniques are described herein that can rebuild the state of a database session transparently, reducing any downtime and enabling the transition of database sessions from one database server to another.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server user calls that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") user calls are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. DBMS 140 directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number nodes to services and allocate resources within nodes for those services. A DBMS may migrate or move a service from one database server to another database server that may run on a different one or more computing nodes. DBMS 140 may do so by assigning the service to be run on the other database server. DBMS 140 may also redirect requests for the service to the other database server after the assignment. In an embodiment, after successfully migrating the service to the other database server, DBMS 140 may halt the service running in the original database server.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 5:
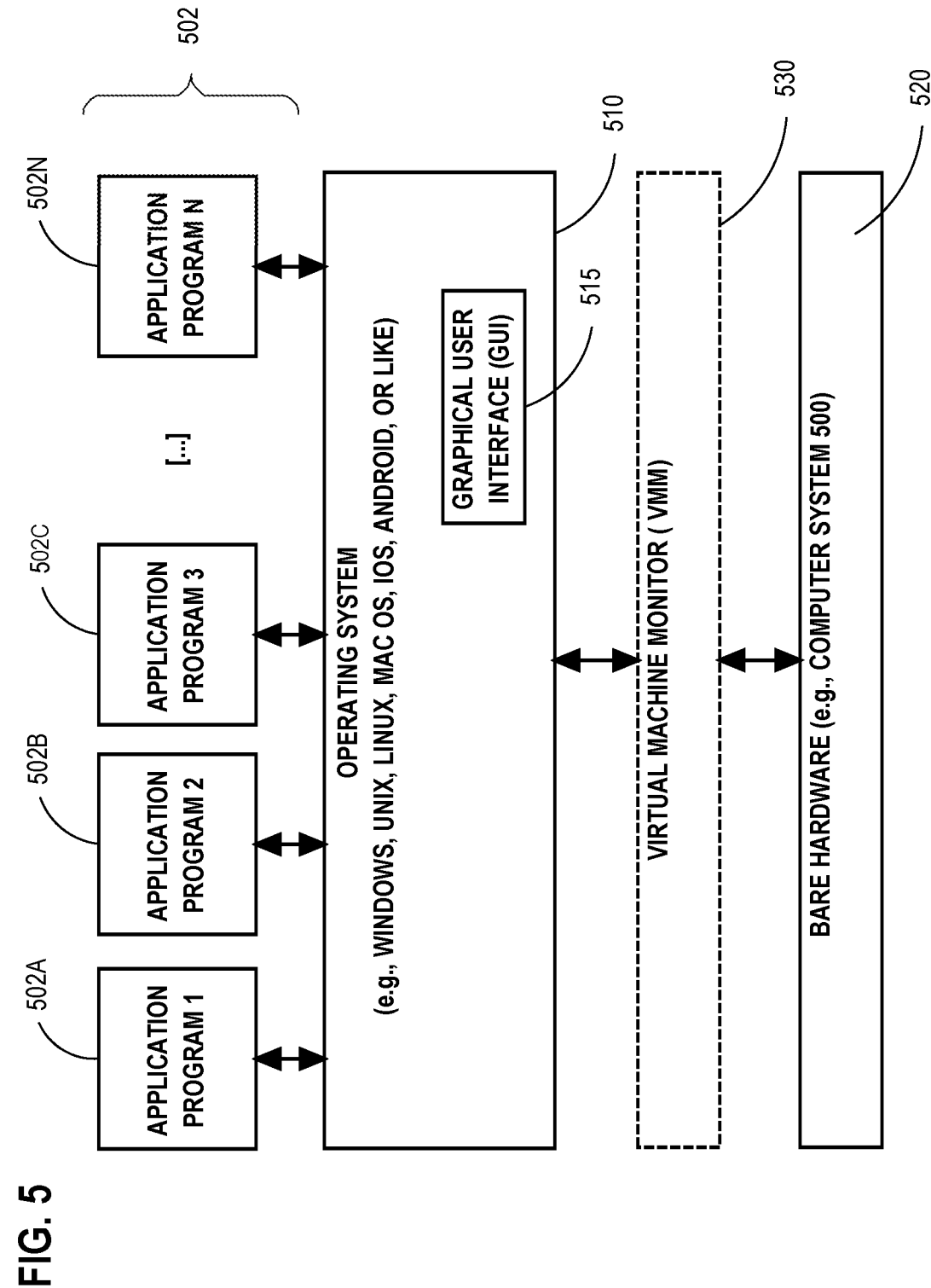
FIG. 5 is a block diagram of a basic software system, in one or more embodiments.
Figure 6:
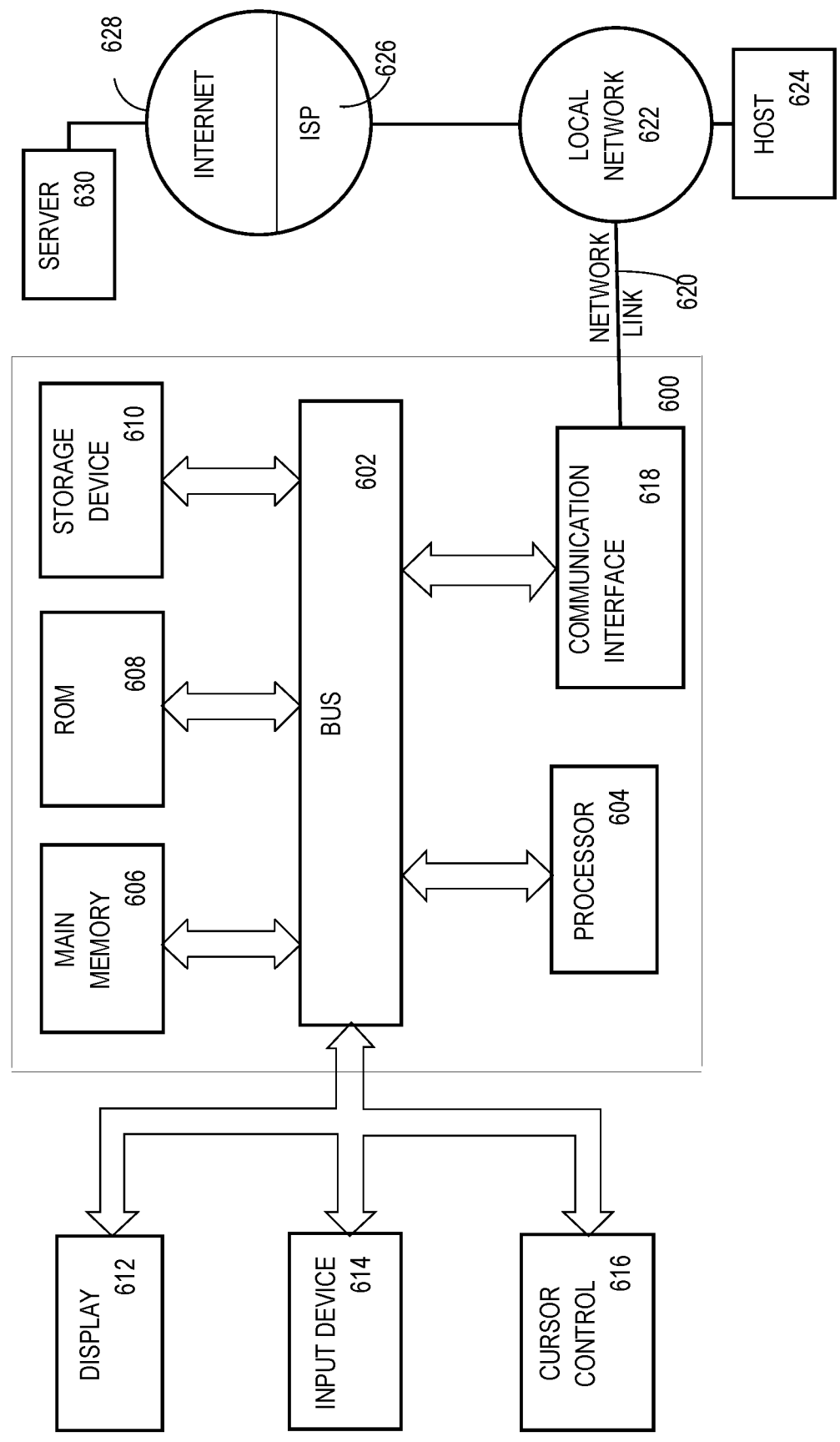
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or another communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a request for a planned operation on a first database server of a DBMS, the first database server having a particular database session established with a client system to receive one or more requests to execute one or more user calls on the DBMS;
in response to the request for the planned operation for the first database server, transmitting to the client system a request to drain database sessions with the first database server including the particular database session, the DBMS being configured to terminate any database session with the first database server that has not been drained within a drain timeout period;
identifying, in a rule set, first rule data, the first rule data including first rule instructions to detect a possible termination point for the particular database session before the drain timeout period expires;
before the drain timeout period expires, executing the first rule instructions at least by calculating one or more database session behavior metrics for the particular database session of the client system with the first database server;
based on the execution of the first rule instructions before the drain timeout period expires and before the drain timeout period expires, determining whether a termination point for the particular database session is detected using the database session behavior metrics;
based on determining that the termination point for the particular database session is detected and before the drain timeout period expires, terminating the particular database session of the client system with the DBMS at the termination point.

2. The method of claim 1, further comprising:
in response to the request for the planned operation for the first database server, transmitting to the client system the request to drain database sessions with the first database server including another database session of the DBMS with the client system;
identifying, in the rule set, second rule data different from the first rule data, the second rule data including second rule instructions to detect a possible termination point for the other database session before the drain timeout period expires;
based on execution of the second rule instructions before the drain timeout period expires, determining whether the termination point for the other database session is detected;
based on determining that the termination point for the other database session is detected, terminating the other database session of the client system with the DBMS at the termination point.

3. The method of claim 1, wherein the rule set includes second rule data, the second rule data having a higher priority for execution than the first rule data, the method further comprising:
based on the second rule data having the higher priority for execution than the first rule data, executing second rule instructions of the second rule data;
based on the executing the second rule instructions, determining that no termination point is detected.

4. The method of claim 1, wherein terminating the particular database session at the termination point further comprises causing the client system to fail over to a second database server of the DBMS by establishing a new database session with the second database server.

5. The method of claim 1, further comprising:
retrieving a set of historical session-level raw statistics for one or more previous database sessions of the client system with the DBMS,
obtaining a set of current session-level raw statistics for the particular database session of the client system with the DBMS at a particular snapshot point in the particular database session;
based on the set of historical session-level raw statistics and the set of current session-level raw statistics, calculating the one or more database session behavior metrics for the particular database session of the client system with the DBMS at the particular snapshot point in the particular database session;

based at least in part on the one or more database session behavior metrics for the particular database session, determining whether the termination point for the particular database session is detected at the particular snapshot point in the particular database session.

6. The method of claim 1, further comprising:

retrieving a set of historical session-level raw statistics for one or more previous database sessions of the client system with the DBMS;

determining that the set of historical session-level raw statistics has missing session-level raw statistics for at least one aspect of the particular database session;

identifying service-level raw statistics in the set of historical service-level raw statistics that correspond to the at least one aspect of the particular database session;

based at least in part on the set of historical session-level raw statistics and the service-level raw statistics in place of the missing session-level raw statistics, calculating the one or more database session behavior metrics for the particular database session of the client system with the DBMS;

based at least in part on the one or more database session behavior metrics for the particular database session, determining whether the termination point for the particular database session is detected.

7. The method of claim 1, further comprising:

based at least in part on raw statistics for the particular database session between the client system and the DBMS, calculating the one or more database session behavior metrics for the particular database session of the client system with the DBMS;

based at least in part on the one or more database session behavior metrics for the particular database session, determining whether the termination point for the particular database session is detected.

8. The method of claim 1, further comprising:

based at least in part on raw statistics for the particular database session between the client system and the DBMS, calculating the one or more database session behavior metrics for the particular database session of the client system with the DBMS;

based at least in part on the one or more database session behavior metrics for the particular database session, estimating whether each and every request in the particular database session is expected to complete before the drain timeout period of the particular database session.

9. The method of claim 1, further comprising:

based at least in part on raw statistics for the particular database session between the client system and the DBMS, calculating the one or more database session behavior metrics for the particular database session of the client system with the DBMS;

based at least in part on the one or more database session behavior metrics for the particular database session, determining a likelihood of a next request containing an unprotected user call.

10. The method of claim 1, further comprising:

determining whether, within a portion of the drain timeout period, any command is issued from the client system to the DBMS over the particular database session;

based on determining whether, within the portion of the drain timeout period, any command is issued from the client system to the DBMS over the particular database session, determining whether the termination point for the particular database session is detected.

11. One or more non-transitory computer-readable media storing instructions, wherein the instructions include a set of instructions, which when executed by one or more hardware processors, cause:

receiving a request for a planned operation on a first database server of a DBMS, the first database server having a particular database session established with a client system to receive one or more requests to execute one or more user calls on the DBMS;

in response to the request for the planned operation for the first database server, transmitting to the client system a request to drain database sessions with the first database server including the particular database session, the DBMS being configured to terminate any database session with the first database server that has not been drained within a drain timeout period;

identifying, in a rule set, first rule data, the first rule data including first rule instructions to detect a possible termination point for the particular database session before the drain timeout period expires;

before the drain timeout period expires, executing the first rule instructions at least by calculating one or more database session behavior metrics for the particular database session of the client system with the first database server;

based on the execution of the first rule instructions before the drain timeout period expires and before the drain timeout period expires, determining whether a termination point for the particular database session is detected using the database session behavior metrics;

based on determining that the termination point for the particular database session is detected and before the drain timeout period expires, terminating the particular database session of the client system with the DBMS at the termination point.

12. The one or more non-transitory computer-readable media of claim 11, wherein the set of instructions further include instructions, which, when executed by said one or more hardware processors, cause:

in response to the request for the planned operation for the first database server, transmitting to the client system the request to drain database sessions with the first database server including another database session of the DBMS with the client system;

identifying, in the rule set, second rule data different from the first rule data, the second rule data including second rule instructions to detect a possible termination point for the other database session before the drain timeout period expires;

based on execution of the second rule instructions before the drain timeout period expires, determining whether the termination point for the other database session is detected;

based on determining that the termination point for the other database session is detected, terminating the other database session of the client system with the DBMS at the termination point.

13. The one or more non-transitory computer-readable media of claim 11, wherein the rule set includes second rule data, the second rule data having a higher priority for execution than the first rule data, wherein the set of instructions further include instructions, which, when executed by said one or more hardware processors, cause:

based on the second rule data having the higher priority for execution than the first rule data, executing second rule instructions of the second rule data;

based on the executing the second rule instructions, determining that no termination point is detected.

14. The one or more non-transitory computer-readable media of claim 11, wherein the set of instructions further include instructions, which, when executed by said one or more hardware processors, cause the client system to fail over to a second database server of the DBMS by establishing a new database session with the second database server.

15. The one or more non-transitory computer-readable media of claim 11, wherein the set of instructions further include instructions, which, when executed by said one or more hardware processors, cause:

retrieving a set of historical session-level raw statistics for one or more previous database sessions of the client system with the DBMS, obtaining a set of current session-level raw statistics for the particular database session of the client system with the DBMS at a particular snapshot point in the particular database session;

based on the set of historical session-level raw statistics and the set of current session-level raw statistics, calculating the one or more database session behavior metrics for the particular database session of the client system with the DBMS at the particular snapshot point in the particular database session;

based at least in part on the one or more database session behavior metrics for the particular database session, determining whether the termination point for the particular database session is detected at the particular snapshot point in the particular database session.

16. The one or more non-transitory computer-readable media of claim 11, wherein the set of instructions further include instructions, which, when executed by said one or more hardware processors, cause:

retrieving a set of historical session-level raw statistics for one or more previous database sessions of the client system with the DBMS;

determining that the set of historical session-level raw statistics has missing session-level raw statistics for at least one aspect of the particular database session;

identifying service-level raw statistics in the set of historical service-level raw statistics that correspond to the at least one aspect of the particular database session;

based at least in part on the set of historical session-level raw statistics and the service-level raw statistics in place of the missing session-level raw statistics, calculating the one or more database session behavior metrics for the particular database session of the client system with the DBMS;

based at least in part on the one or more database session behavior metrics for the particular database session, determining whether the termination point for the particular database session is detected.

17. The one or more non-transitory computer-readable media of claim 11, wherein the set of instructions further include instructions, which, when executed by said one or more hardware processors, cause:

based at least in part on raw statistics for the particular database session between the client system and the DBMS, calculating the one or more database session behavior metrics for the particular database session of the client system with the DBMS;

based at least in part on the one or more database session behavior metrics for the particular database session, determining whether the termination point for the particular database session is detected.

18. The one or more non-transitory computer-readable media of claim 11, wherein the set of instructions further include instructions, which, when executed by said one or more hardware processors, cause:

based at least in part on raw statistics for the particular database session between the client system and the DBMS, calculating the one or more database session behavior metrics for the particular database session of the client system with the DBMS;

based at least in part on the one or more database session behavior metrics for the particular database session, estimating whether each and every request in the particular database session is expected to complete before the drain timeout period of the particular database session.

19. The one or more non-transitory computer-readable media of claim 11, wherein the set of instructions further include instructions, which, when executed by said one or more hardware processors, cause:

based at least in part on raw statistics for the particular database session between the client system and the DBMS, calculating the one or more database session behavior metrics for the particular database session of the client system with the DBMS;

based at least in part on the one or more database session behavior metrics for the particular database session, determining a likelihood of a next request containing an unprotected user call.

20. The one or more non-transitory computer-readable media of claim 11, wherein the set of instructions further include instructions, which, when executed by said one or more hardware processors, cause:

determining whether, within a portion of the drain timeout period, any command is issued from the client system to the DBMS over the particular database session;

based on determining whether, within the portion of the drain timeout period, any command is issued from the client system to the DBMS over the particular database session, determining whether the termination point for the particular database session is detected.

* * * * *